United States Patent [19]
Jaccard et al.

[11] 3,709,273
[45] Jan. 9, 1973

[54] FOOD SLICING APPARATUS

[75] Inventors: Andre Robert Jaccard, Buffalo, N.Y.; Bernhard Hinkers, Werther, Germany

[73] Assignee: Jaccard Corporation, Erie, N.Y.

[22] Filed: July 21, 1970

[21] Appl. No.: 56,844

[52] U.S. Cl. ................................................. 83/751
[51] Int. Cl. ........................... B26d 4/06, B26d 4/14
[58] Field of Search ............... 146/163, 168, 169, 98; 146/168

[56] References Cited

UNITED STATES PATENTS

| | | | |
|---|---|---|---|
| 2,150,735 | 3/1939 | Williams | 146/163 |
| 2,471,062 | 5/1949 | Davis | 146/98 X |
| 3,148,720 | 9/1964 | Olson et al. | 146/98 |

*Primary Examiner*—Willie G. Abercrombie
*Attorney*—Ashlan F. Harlan, Jr.

[57] ABSTRACT

A method of and apparatus for slicing a cut of meat or other food product into a plurality of slices of desired thicknesses simultaneously. A cut of meat is placed on a cutting block having a pusher element mounted thereon. The cutting block is mounted on a carriage that is reciprocable relative to an elongated cutting head having a plurality of transversely spacing cutting blades which is mounted on a frame in overlying relation to the carriage. Means are provided for advancing the carriage and thereby the cut of meat through the cutting blades to slice the meat into a plurality of slices of predetermined thickness.

17 Claims, 7 Drawing Figures

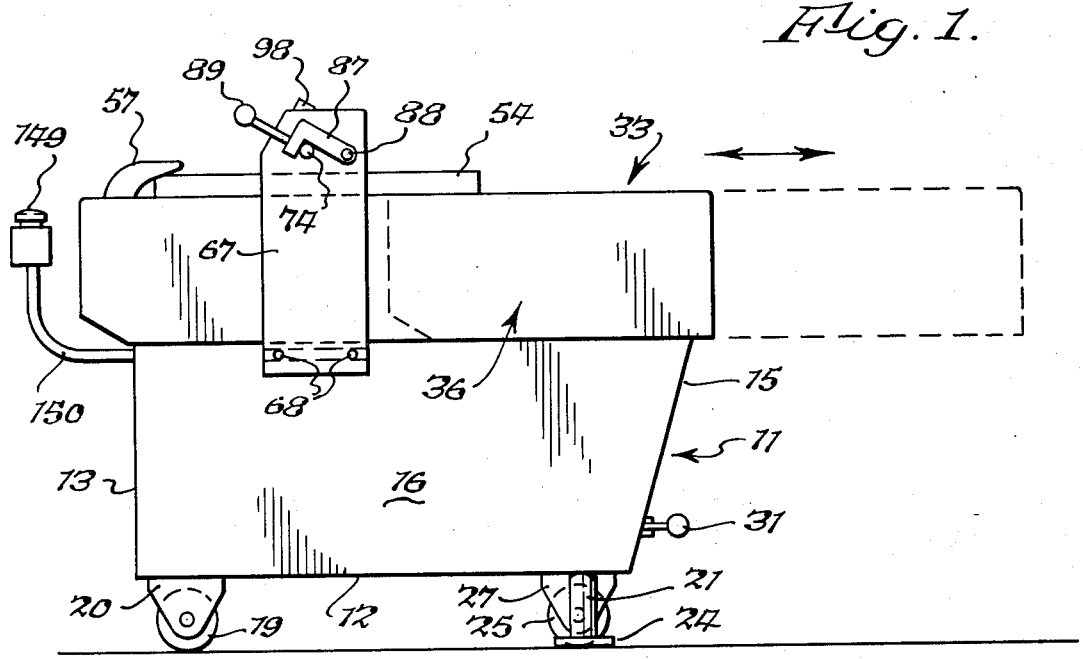
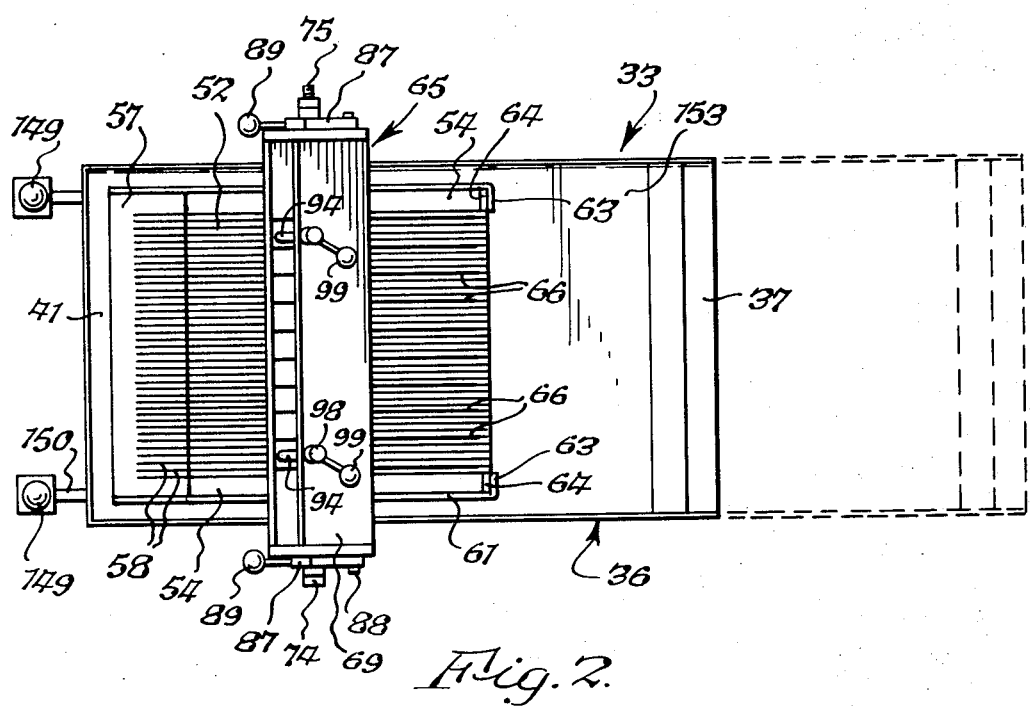

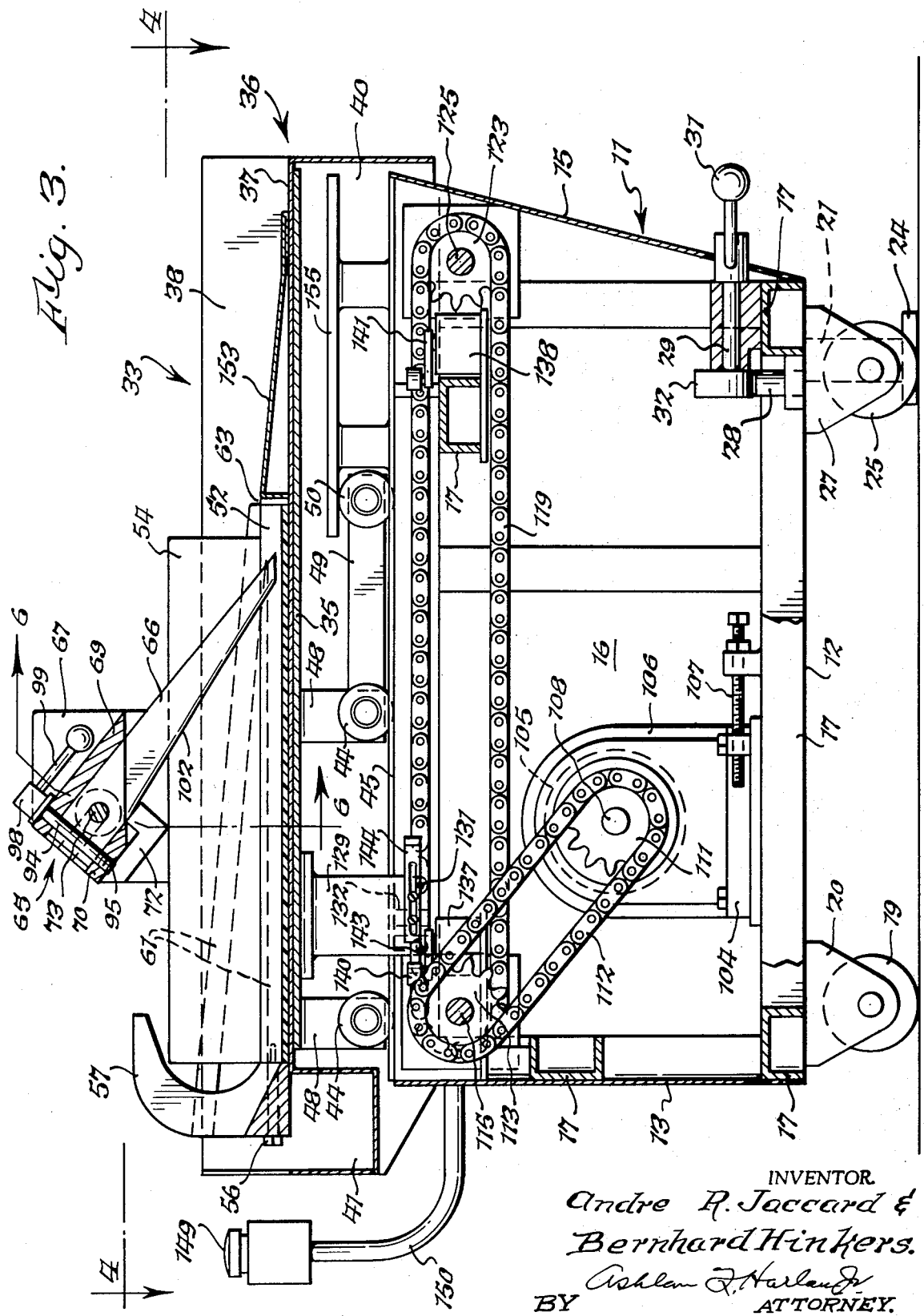

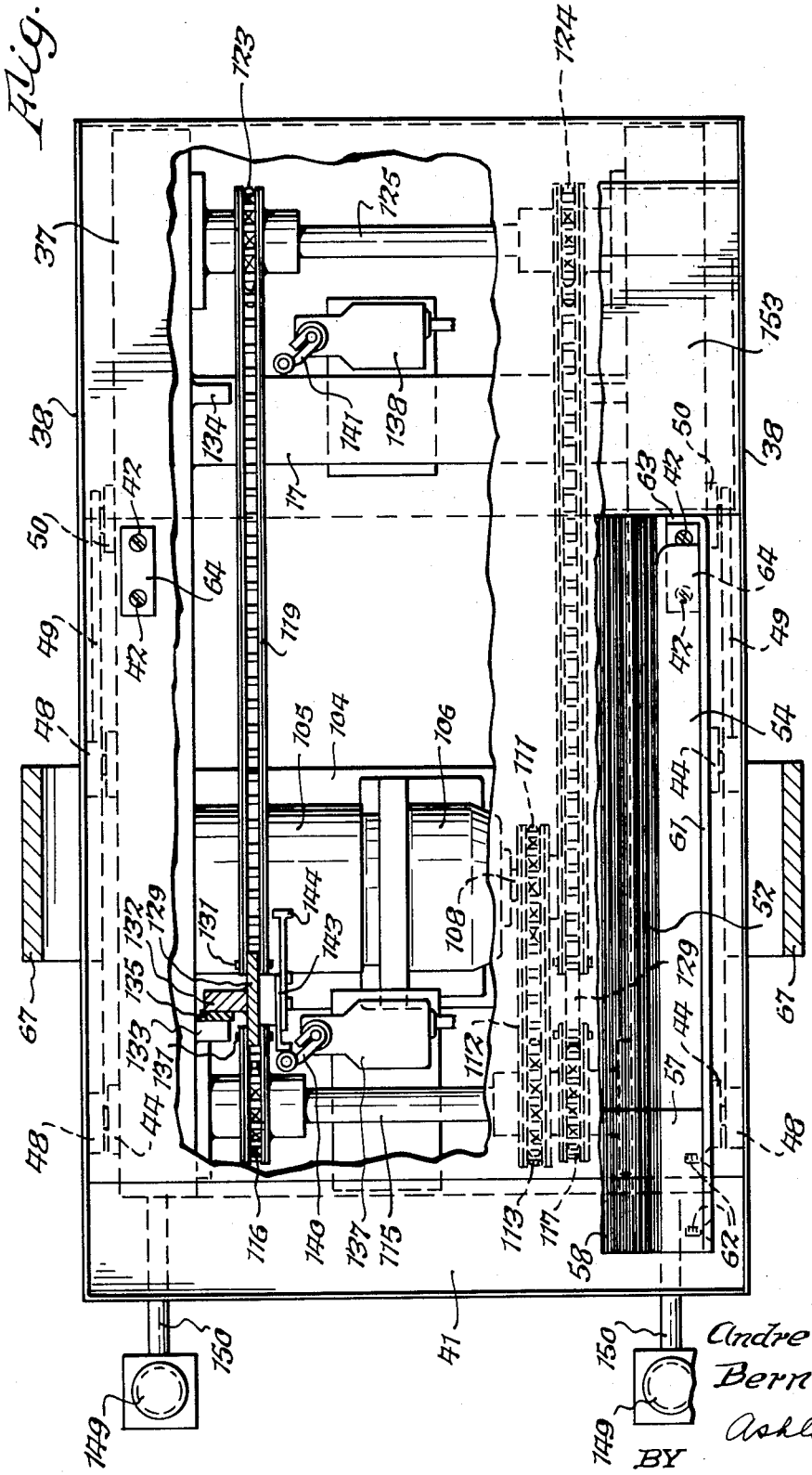

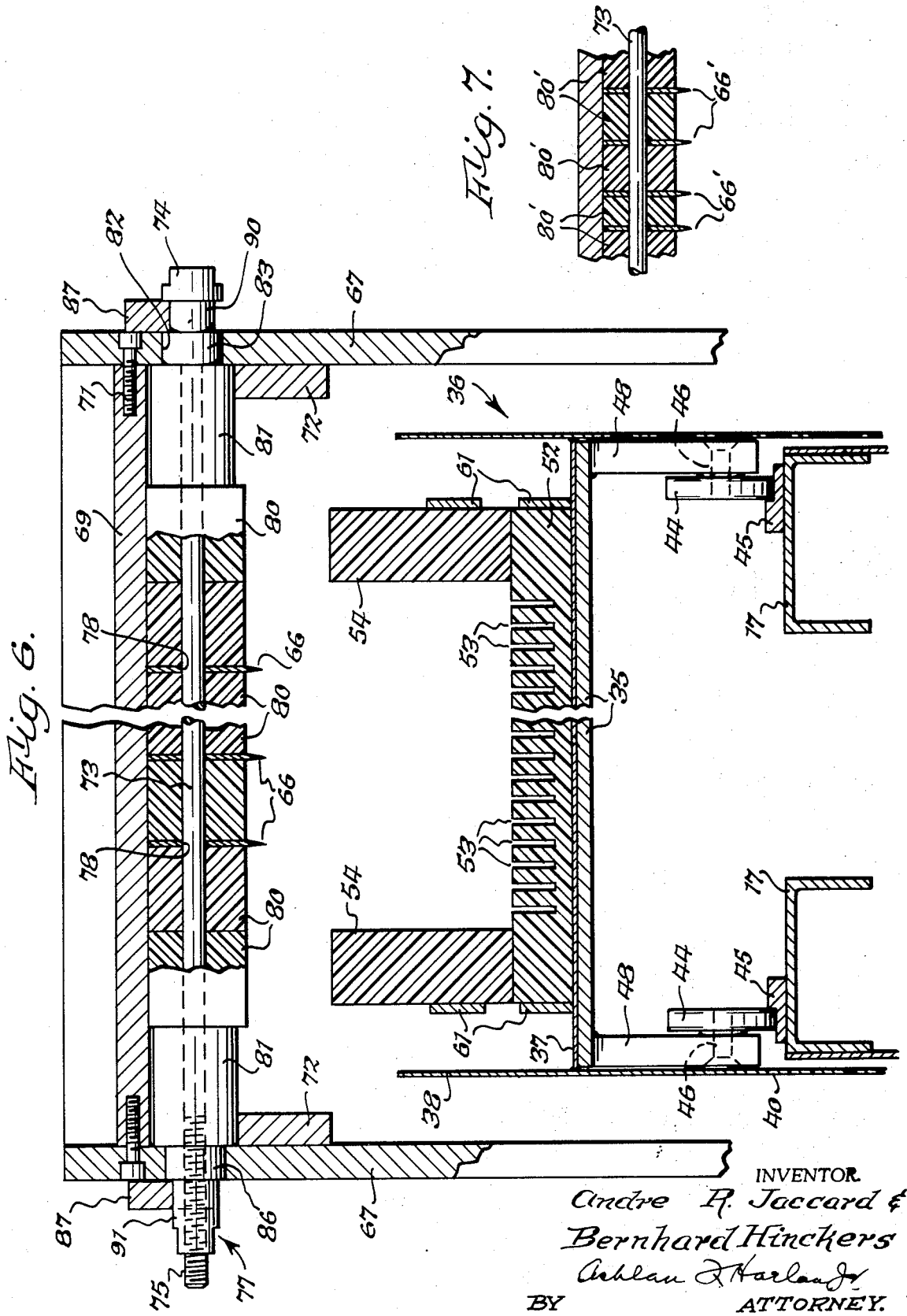

FOOD SLICING APPARATUS

BACKGROUND OF THE INVENTION

This invention relates generally to the slicing of food products and, more particularly, to a method of and apparatus for rapidly slicing a large cut of meat into a plurality of slices of controlled thickness.

In various known food slicing machines, and especially those used for slicing meat, rotary cutting blades are commonly employed and are often moved in a linear path into a product to be sliced, which product is held in a stationary position. Many of these conventional machines cut only a single slice at a time and often it is difficult to obtain the precise thickness desired, when dependence must be placed on the skill of the operator. These machines are particularly unsatisfactory when a large number of portions of equal thickness are desired.

SUMMARY OF THE INVENTION

The present invention obviates the above disadvantages by providing an improved method of and apparatus for cutting a food product into a plurality of slices of exact predetermined thickness by passing such product through a plurality of stationary blades. The invention is particularly useful in slicing large cuts of meat and the following description is directed to a preferred embodiment and its operation for that use.

Generally speaking, the apparatus of the present invention is characterized by a base, which can be rendered portable, having a stationary cutting head, including a plurality of blades, mounted thereon in overlying, transverse relation to the base. A carriage is mounted on the base for reciprocating movement back and forth below and past the cutting head. The carriage is provided with a cutting block, having a pusher member secured thereto at one end, to accommodate a cut of meat. Longitudinal slots are provided in both the pusher member and the block to receive the fixed cutting blades mounted on the cutting head as the carriage passes thereunder. Suitable drive means is operatively connected to the carriage for reciprocating the same to sever the cut of meat into slices of desired thickness.

BRIEF DESCRIPTION OF THE DRAWINGS

FIG. 1 is a side elevational view of a food slicing apparatus constructed in accordance with this invention;

FIG. 2 is a top plan view of the food slicing apparatus of FIG. 1;

FIG. 3 is an enlarged, longitudinal sectional view of the food slicing apparatus of FIG. 1;

FIG. 4 is an enlarged sectional view along line 4—4 of the food slicing apparatus of FIG. 1, partially broken away to show details of the drive mechanism;

FIG. 5 is a schematic view illustrating the drive control means for the apparatus;

FIG. 6 is a fragmentary, vertical, cross sectional view taken along line 6—6 of FIG. 3; and FIG. 7 is a fragmentary, sectional, reduced view of another form of cutting head for apparatus according to the present invention.

DETAILED DESCRIPTION OF A PREFERRED EMBODIMENT

In the illustrated embodiment of a food slicing apparatus, particularly suitable for slicing meat, according to the present invention, the reference numeral 11 denotes a metal base of generally box-like construction having a bottom 12, a front wall 13, a rear wall 15 extending upwardly and rearwardly from the bottom, and a pair of opposite side walls 16. These walls are suitably secured to each other and to channel-shaped structural members identified by reference numeral 17 (FIG. 3) which are fastened together in suitable manner, such as welding, to provide a frame for base 11. For purposes of this description, the left end of the apparatus as viewed in FIGS. 1 to 4 will be designated the forward or front end thereof. The terms, front, rear, forwardly, rearwardly, upwardly, downwardly and the like as used herein are applied only for convenience of description and should not be taken as limiting the scope of this invention.

The base 11 is normally supported in a stationary position on a pair of laterally spaced, front wheels 19 each of which is rotatably mounted in a bracket 20 and a pair of laterally spaced, rear legs 21 having enlarged feet 24, the brackets and legs depending from and being fastened to the bottom 12. Intermediate the legs 21 at the rear end of the bottom 12 is a caster roller 25 supported for rotation in a bracket 27. The bracket 27 is carried by a vertical stub shaft 28 which is mounted for rotary and vertical movement. A cam shaft 29 normal to the stub shaft 28 and having a handle 31 that projects through end wall 15 operates a cam 32 which engages the upper end of the shaft 28 and is adapted to depress the latter to permit the roller 25 to engage the floor or ground and thereby raise the rear end of the base 11 so the apparatus may be rolled around. A flattened portion (not shown) on the cam 32 serves to lock the roller 25 in lowered position.

A carriage, comprehensively designated by the numeral 33, is supported on the base 11 for reciprocating movement longitudinally thereof. The carriage 33 comprises a platform 35 on which is carried a tray 36 having a bottom 37, longitudinally extending, upright sides 38, and longitudinally extending side skirt panels 40 which may be integral with sides 38 and which extend downwardly below the top of the base 11. The tray 36 is therefor substantially H-shaped in transverse section, as shown in FIG. 6. The tray, which has a depressed well 41 at the front end thereof, serves as a basin for catching and containing juices resulting from the meat slicing operation. The tray is secured to the platform 35 by screws 42 which threadedly engage in the platform.

As best seen in FIGS. 3 and 6, the carriage 33 is supported for horizontal reciprocating movement on the base 11 by rollers 44 running on and guided by longitudinal rails 45 carried by the base 11 and suitably secured thereto in transversely spaced relation. The rollers 44 are rotatably supported, preferably by conventional antifriction bearings (not shown), on studs 46. The latter are secured to and carried by legs 48 that depend from platform 35 on the opposite sides thereof. Rigidly secured to each of the rearward pair of legs 48 is a horizontal arm 49, projecting rearwardly and carrying adjacent its free end a roller 50 mounted in the same way as rollers 44 for cooperation with the tracks 45.

Resting on the tray bottom 37 is a cutting board or block 52 (best shown in FIGS. 2 and 6) having a substantial thickness and provided with a series of tranversely spaced, longitudinally extending slots 35 extending downwardly from the upper surface of the block. The board or block 52 is preferably formed of a sanitary plastic material such as nylon, but can be formed of other suitable material, as desired. A pair of upright, longitudinally extending side walls 54, preferably made of the same material as the block 52, are mounted on the upper surface of the block along the side edges thereof and adhesively or otherwise suitably secured thereto.

Secured to the front end of the cutting board or block 52, by suitable means such as machine screws 56, is a pusher member 57 which is preferably formed from the same material as the block 52. The pusher extends from side to side of the block 52 and has a substantially C-shaped section tranversely of the machine with the upper and lower portions extending rearwardly. The upper portion of the pusher member 57 is provided with slots like the upper surface of the cutting board 52. The slots 58 extend downwardly through the major portion of the height of the pusher member. The mounting of the pusher member 57 on the board 52 is such that the slots 53 and 58, which are the same in number, width, and spacing, are longitudinally aligned. To assist in holding the pusher member 57 in place under the severe stresses it encounters, there is provided a pair of bifurcated metal brackets 61 which are suitably secured, as by screws 62, at their front ends to the upstanding sides of the pusher member and are bent inwardly at their rearward ends as shown at 63 (see FIG. 4) for suitable attachment, for example, by screws (not shown) to metal blocks 64 that are held in place by the screws 42 on the bottom 37 of tray 36.

An elongated, stationary cutting head, comprehensively designated 65, is mounted above carriage 33 and is provided with a plurality of spaced, elongated cutting blades 66 for slicing a cut of meat. As shown in FIG. 6, the cutting head 65 is carried by and mounted between a pair of vertically extending side plates 67 carried by the base 11, the plates 67 being attached by suitable means, such as screws 68, to the base 11 on the sides thereof and extending upwardly above the carriage 33. A pair of cross plates 69 and 70, (for plate 70 see FIG. 3), are provided between the side plates 67 for clamping the cutting head 65 in place with the blades 66 extending longitudinally of the carriage, as will hereinafter be explained. The plate 69 is secured to the side plates by suitable fasteners such as screws 71, (see FIG. 6). Blocks 72 carried on the facing sides of the side plates 67 provide ledges on which the lower cross plate 70 rests, both cross plates being downwardly inclined toward the rear end of the carriage 33. The side plates 67 and the cross plates 69 and 70 thus form an inverted, generally U-shaped, structure straddling the upper end of the base 11 and the carriage 33.

The cutting head 65 also comprises an elongated shaft 73 having a headed end 74 and a threaded end 75 provided with a nut 77. The cutting blades 66 are provided with apertures 78 for mounting such blades on shaft 73. Spacers 80 are also mounted on shaft 73 between adjacent blades 66, which in most cases are spaced on shaft 73 at equal distances. These spacers 80 may, however, vary in length as hereinafter explained, to space adjacent blades 66 at any desired distance. Spacers 80 preferably are formed of a sanitary plastic material such as nylon, but may be composed of any suitable and durable material including metal, as desired. A pair of sleeves 81 are mounted on the shaft 73 adjacent the opposite ends thereof so that when the nut 77 is tightened the blades 66 and spacers 80 will be clamped together.

Adjacent the top of each of side plates 67 is a diagonally arranged slot 82. The cutting head assembly 65 is installed in the U-shaped mounting structure composed of side plates 67 and cross plates 69 and 70 by sliding an enlarged portion 83 on the head 74 of the shaft 73 and an enlarged portion 86 on the nut 77 into the slots 82 so that the assembly rests between the cross plates 69 and 70. Withdrawal of the assembly is prevented by a pair of L-shaped clamp members 87, pivotally mounted on side plates 77 by studs 88, which may be swung into clamping position about reduced diameter portions 90 and 91 of the head 74 of shaft 73 and the nut 77, respectively, by handles 89.

As earlier mentioned, cross plates 69 and 70 also serve clamping members for more firmly securing the cutting head 65 in place. A pair of laterally spaced bolts 94 extend through suitable openings in cross plate 69 and have end portions 95 threadedly engaged in cross plate 70 (see FIG. 3). The upper ends of bolts 94 are provided with heads 98 having lever handles 99 thereon. Tightening bolts 94 force cross plates 69 and 70 together to secure the cutting head 65 mounted therebetween rigidly in place.

A significant and important feature of this invention is that the entire cutting head assembly can be quickly removed or replaced by merely removing bolts 94 from cross plates 69 and 70 and swinging clamp members 87 out of engagement with the ends of shaft 73. The assembly is then free to be lifted from the slots 82. Thus, the cutting head 65 can be readily removed for easy cleaning and/or sharpening of the blades, or for replacement with a different cutting head.

It will be seen from FIG. 3 the each cutting blade 66 has a cutting edge 102 engageable with a cut of meat as it passes thereunder on carriage 33. In order to achieve optimum slicing action, it is important that the cutting edges 102 be oriented at the proper downward angle in a direction toward the rear of the apparatus. It has been found that a cutting edge orientation of 30° – 32° relative to a horizontal plane cut through the axis of the shaft 73 produces the best results.

Drive means is provided for reciprocating the carriage 33 as desired, such means, seen best in FIGS. 3 and 4, comprising a suitable reversible electric motor 105 operatively connected to a suitable speed reducing gear mechanism 106. These are carried on a bed plate 104 slidably mounted in the base 11 and adjustably held in position by adjusting screw 107. The output shaft 108 of the speed reducer 106 carries a drive sprocket 111 which engages and drives an endless chain 112 which, in turn, drives a sprocket 113 that is rigidly secured on a rotable shaft 115. The shaft 115 is suitably journalled at its ends in base 11 adjacent the front end thereof and is provided, adjacent its ends, with sprockets 116 and 117 which are rigidly secured thereon and which, respectively, drive endless operating chains 119 and 120. The chains 119 and 120 extend horizontally and pass around idler sprockets 123 and 124, respectively, which are mounted on a shaft 125 suitably journalled for rotation in the base 111 adjacent the rear end thereof.

The carriage 33 is reciprocated by the chains 119 and 120 to which it is connected. The connections to both chains are identical and, as shown in FIGS. 3 and 4, each connection comprises a depending pedestal or leg rigidly secured, as by welding or bolts (not shown), to the bottom of the platform 35 adjacent the front end thereof. Each pedestal comprises a vertical plate 129 connected in one of the chains 119, 120 by pins or bolts 131 so that movement of the chains around the sprockets 116, 117 and 123, 124 results in longitudinal movement of the carriage 33. A lug 132 rigidly attached to each of the plates 129 and extending outwardly normal thereto is adapted to engage stops 133 and 134 rigidly attached to the base 11 to limit movement of the carriage in each direction. As shown in FIG. 4, elements 135 of suitable resilient or compressible material may be carried by the lugs 132 or the stops 133 and 134 to cushion contact between the stops and the lugs.

As part of the controlling mechanism for the cutting machine of the present invention, two limit switches 137 and 138 having actuating levers 140 and 141, respectively, are suitably mounted in the base 11 adjacent the front and rear ends thereof. Mounted on a lug on the inwardly-facing side of the plate 129 of the left hand pedestal 128 are pair of relatively adjustable longitudinally extending, actuating arms 143 and 144 adapted, respectively, to engage the levers 140 and 141 during operation as hereinafter explained.

In using the apparatus, the carriage 33 is initially located at its forward position as shown in FIGS. 1 and 2 with a cutting head 65 placed and secured in position between the side plates 67 and the cross plates 69 and 70. A slab or cut of meat, preferably elongated, is placed on the cutting block 52 against the rear, curved face of pusher member 57. To start the automatic operation of the apparatus the two identical start buttons 149, mounted in spaced transverse relation on tubular arms 150 projecting outwardly and upwardly from the front of the base 11, are simultaneously depressed, thus activating through a suitable control means 148, shown schematically in FIG. 5, a switch (not shown) to energize the circuit to motor 105 from power input 152. The motor drives the top run of endless chains 119 and 120 in the rearward direction by means of the speed reduction mechanism 106, shaft 108, sprocket 111, chain 112, sprocket 113, shaft 115 and sprockets 116 and 117. The carriage 33 is thereby moved rearwardly to the position shown in broken lines in FIGS. 1 and 2, carrying with it the cut or slab of meat to be sliced. As the meat engages and passes by the cutting blades 66, the slab is cut into slices of the desired thickness. These slices slide onto an inclined pan 153 carried by the tray 36 adjacent the rear end of cutting block 52, from which they may be removed as convenient.

As the cut of meat engages the cutting blades 66, a strong downward force is exerted against the carriage 33, thus tending to urge the rearward portion thereof upwardly about a pivot axis defined by the engagement of the slab of meat with cutting blades 66. In order to prevent such a pivoting action, a pair of guide rails 155 are mounted on the opposite sides of base 11 to engage the rollers 50 on the carriage which extend thereunder.

As the carriage 33 moves rearwardly, the rearward end of actuator arm 144 engages the actuating lever 141 of limit switch 138, which, through the control means 148, reverses the direction of rotation of the motor 105 to effect return of the carriage 33 to its initial position. When the forward end of actuator arm 143 engages the actuating lever 140 of limit switch 137 the motor circuit is deenergized by the control means to stop operation of the apparatus. The operator may then place another slab or cut of meat on the block or cutting board 52 and again iniate the operation by pushing the button 149. In the event there is such a malfunction in either the limit switch 137 or 138 or any other component in the electric circuitry as to prevent either reversal of the carriage 33 or stoppage of the same when reaching its normal position, the appropriate stops 133 or 134 will be engaged by lugs 132 to prevent overrun of the carriage. The control means 148 may be formed of conventional elements suitably connected to perform the described functions in a manner known in the art.

It will be seen in FIG. 6 that the slots 53 in the cutting board 52 are straight and evenly spaced apart as small intervals. This is a preferred construction because slices of desired thickness may be more conveniently obtained. As will be noted, the spacing between the cutting blades 66 on the cutting head 65 is such that a blade is associated with each fifth slot across the slotted area of the board 52. Thus, if the distance between slots is ¼ inch (0.635 cm.), each slice of meat produced will be substantially 1 inch (2.54 cm.) in thickness. Should it be desired to produce thinner slices, the spacing between the blades 66 may be reduced in increments of ¼ inch. As will be further noted the distance from the inner, facing sides of the side walls 54 to the immediately adjacent blades 66 is the same as the distance between the blades, thereby ensuring even slicing of a cut of meat which fits snugly between the side walls 54. Slices of a selected thickness are consistently obtained regardless of the skill of the operator.

It will be understood, however, that a cut of meat may, if desired, be simultaneously cut into slices which are not of the same thickness. This may be readily accomplished by the use of cutting head 65' such as illustrated in FIG. 7 having the cutting blades 66' separated by spacers 80' of unequal length so chosen that the blades are spaced apart the distance between two slots in the cutting board or desired multiples of such distance. Thus, for example, some slices could be ½ in. (1.27 cm.) thick, while others might be 2 inches (5.08 cm.) thick.

An important feature of the present invention is the ease with which cutting heads may be removed and installed as previously described. There is, accordingly, no necessity for sharpening the blades while they are installed on the machine with consequent loss of machine time and need for cleaning the machine after sharpening. Also, replacement of a cutting head with another head having the same or a different spacing between the cutting blades is easy and rapid.

As a consequence of the novel construction of the slicing machine of the present invention and its convenient and efficient operation, it is possible to slice meat very rapidly. Indeed, cuts of beef may be sliced to produce up to about 7000 steaks per hour. The operation of the machine is also safe since the use of two control buttons for operation, the buttons being so spaced as to require both hands of the operator to start the machine, prevents accidents.

It will be understood that machines according to the present invention may be provided with conveyors (not shown) to remove the slices from the machine and/or to feed suitable cuts of meat to the machine. It will also be understood that slicing machines according to the invention can be varied in dimensions, number of slicing blades, driving mechanism, and in other details without departing from the spirit of the invention.

A preferred embodiment of this invention having been hereinabove described and illustrated, it is to be understood that numerous modifications thereof can be made without departing from the broad spirit and scope of this invention as defined by the appended claims.

We claim:

1. Slicing apparatus adapted for simultaneously cutting a foodstuff into a plurality of slices of predetermined thickness comprising: a base; an elongated cutting head mounted on said base in overlying transverse relation thereto, said cutting head including a plurality of elongated cutting blades spaced on said head transversely of said base; a carriage having rollers mounted on said base below said cutting head, said rollers engaging said base and allowing horizontal reciprocating movement of said carriage longitudinally of said base; a cutting block removably mounted on said carriage for holding said foodstuff and having a plurality of transversely spaced longitudinal slots therein to receive said cutting blades; means mounted at one end of said block for pushing said foodstuff through said cutting blades as said carriage moves thereunder, said pushing means having a plurality of slots in registry with said longitudinal slots of said block; and drive means for moving said carriage, and thereby said pushing means, past said cutting head.

2. Apparatus as set forth in claim 1 in which said cutting head is removable.

3. Apparatus as set forth in claim 1 in which said cutting blades extend longitudinally of said base.

4. Apparatus as set forth in claim 1 in which said cutting block is mounted in a tray adapted to collect fluid resulting from the slicing.

5. Apparatus as set forth in claim 4 in which said carriage comprises a platform on which said tray is removably mounted.

6. Apparatus as set forth in claim 1 in which said pushing means comprises a portion having an inwardly curved face toward said cutting head.

7. Apparatus as set forth in claim 1 in which said drive means comprises a motor, control means for reversing said motor, and means operatively connecting said motor and said carriage.

8. Apparatus as set forth in claim 7 in which said connecting means are drive chains.

9. Apparatus as set forth in claim 1 in which said longitudinal slots in said cutting block are regularly spaced and said cutting blades have cutting edges that are spaced apart distances which are the same as or multiples of the distance between adjacent slots.

10. Apparatus as set forth in claim 9 in which said cutting edges are spaced apart at equal distances.

11. Apparatus as set forth in claim 9 in which at least some of said cutting edges are spaced apart at distances which are different from others.

12. Apparatus as set forth in claim 2 in which said cutting head is mounted between transversely spaced plates extending upwardly from said base and may be readily removed or replaced, and in which said cutting blades extend longitudinally of said base.

13. Apparatus as set forth in claim 12 in which said cutting blades extend diagonally downward away from said pushing means and are held in position by clamping means.

14. Apparatus as set forth in claim 12 in which said cutting blades are removably mounted in said head and have removable spacing means associated therewith.

15. Apparatus as set forth in claim 12 in which said cutting head is mounted in aligned slots in said plates and is held therein by clamping means.

16. Apparatus as set forth in claim 13 in which the cutting edges of said blades are at an angle of from 30° to 32° from the horizontal.

17. Apparatus as set forth in claim 1 in which said carriage comprises a rolling platform on which a tray adapted to collect fluid resulting from said slicing is removably mounted, aid cutting block being mounted in said tray; said pushing means comprises a portion having an inwardly curved face toward said cutting head; said cutting head is removably mounted, in aligned slots, between tranversely spaced plates that extend upwardly from said base and clamping means, including a pair of transverse plates carried by said first-mentioned plates, is provided to hold said head between said first-mentioned plates with said cutting blades in aligned position extending diagonally downward away from said pushing means with the cutting edges thereof being at an angle of from 30° to 32° from the horizontal, said cutting blades are removably mounted in said head and have removable spacing means associated therewith; said longitudinally spaced slots in said cutting block are regularly spaced and said cutting edges are spaced apart distances which are the same as or multiples of the distance between adjacent slots; and said drive means comprises a motor, chains driven by said shaft and having an operable connection to said carriage to move the same, and control means whereby said carriage is caused to reciprocate longitudinally of said base.

* * * * *